United States Patent

[11] 3,620,532

| [72] | Inventor | Russell H. Graf<br>7315 West Duluth Ave., Milwaukee, Wis. 53220 |
|------|----------|---|
| [21] | Appl. No. | 869,214 |
| [22] | Filed | Oct. 24, 1969 |
| [45] | Patented | Nov. 16, 1971 |

[54] FISHING GAME
10 Claims, 6 Drawing Figs.

| [52] | U.S. Cl. | 273/1 R, 35/22 A, 273/140 |
|------|----------|---|
| [51] | Int. Cl. | A63f 9/00 |
| [50] | Field of Search | 273/1, 140 |

[56] References Cited
UNITED STATES PATENTS

| 2,598,487 | 5/1952 | Anechiarico | 273/140 X |
| 2,611,617 | 9/1952 | Strohm | 273/140 |

*Primary Examiner*—Richard C. Pinkham
*Assistant Examiner*—Paul E. Shapiro
*Attorney*—Wheeler, House & Wheeler

ABSTRACT: A game for children includes a plurality of imitation fish with simulated fishmouths which in one embodiment are formed by a first bore extending inwardly from the nose of the fish to a cross bore which simulates the eyes of the fish. Channels along the sides of the first bore permit a simulated fish lure in the form of a sphere fixed to a fishline to move into a coupled position in the cross bore. Fish lures of various configurations and bores of different sizes and configurations provide selectivity in coupling the lures for the various fish.

PATENTED NOV 16 1971 3,620,532

Inventor
Russell H. Graf
By
Wheeler, Wheeler, House & Clemency
Attorneys

FISHING GAME

BACKGROUND OF INVENTION

The invention relates to a game for amusing young children and for improving their dexterity and knowledge of geometric configurations and colors.

SUMMARY OF INVENTION

The invention provides a game for children which includes a plurality of different size fish and a plurality of fish lures. Each of the fish is provided with means defining a simulated fishmouth which is adapted to receive some of the lures, exclude other of the lures, and couple with one of the lures to permit the game player or players to raise the fish from a surface with a fish pole. The selectivity between the fish lures and fish is afforded by the use of different size apertures which define the fishmouth and lures of various sizes, or by the use of lures and fishmouths having various geometric configurations. The lures can have the shape of spheres, cubes, pyramids, etc., and the fishmouths can be provided with apertures having appropriate configurations for receiving the lures. The fish lures and the fish that couple can have matching colors or matching indicia.

The lures are secured to the fishline by an arrangement which includes a string loop fastened to the lure and an imitation bobber or float on the end of the fishline which is received within the loop. In one embodiment of the invention, the mouth of the fish is defined by a first bore extending inwardly and rearwardly from the nose or forward end of the fish. The bore extends into a cross bore or transverse through aperture which simulates the eyes of the fish. Channels between the first bore and the fish sides afford movement of the fish lure and string loop through the first bore into the second bore. The second bore has a smaller diameter than the first bore and thus prevents escape of lure through the second bore. When a lure is coupled in the mouth of a fish, the fish can be raised from a surface by manipulating the fish pole.

It is an object of the invention to provide an educational game for children to teach colors, size relationships, geometric configurations, coordination and dexterity.

It is a further object of the invention to provide a game for children which includes imitation fish of various sizes and colors and imitation fish lures of various configurations and colors, and in which the fish are provided with apertures which have simulated fishmouths which receive the fish lure and apertures simulating a fisheye, which apertures couple with at least one of the lures to permit the fish to be raised with a fish pole to simulate fish catching activity.

Further objects and advantages of the invention will become apparent from the following disclosure.

THE DRAWING

FIG. 1 is a perspective view of imitation fish, imitation fishing lures and a fishing rod in accordance with the invention.

FIG. 2 is an enlarged fragmentary sectional view along line 2—2 of FIG. 1 showing a fish lure coupled with the mouth of one of the fish.

FIG. 3 is a view similar to FIG. 2, showing a lure escaping from the fishmouth.

FIG. 4 is a further embodiment of a fish lure.

FIG. 5 is an end view of a further embodiment of an imitation fish adapted to receive the fish lure shown in FIG. 4.

FIG. 6 is a perspective view of an additional embodiment of a fish lure in accordance with the invention.

DESCRIPTION OF THE DRAWING

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

FIG. 1 also discloses a plurality of imitation fish lures 20, 22 and 24 which are in the form of spheres of varying diameters. FIG. 1 also discloses a fish pole 26 having a fishline 28.

Figure 1:
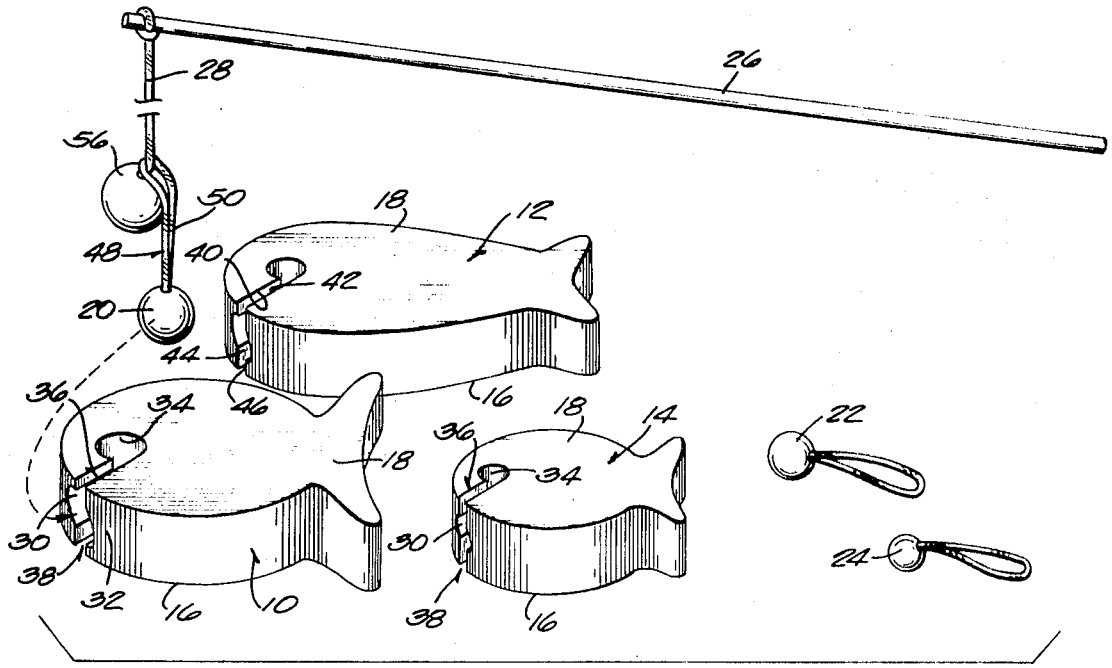
FIG. 1 discloses three imitation fish, 10, 12 and 14. The fish 10, 12 and 14 can be made from wood, plastic or other suitable material and be provided with parallel opposed side surfaces 16 and 18.

In accordance with the invention, each of the fish is provided with means defining a simulated fishmouth adapted to selectively receive some of the lures, exclude other of the lures, and couple with at least one of the lures to permit raising of the fish with the fish pole 26 and line 28 to simulate fish-catching activity. As disclosed in FIG. 1, the means includes a first aperture or bore 30 which extends inwardly from the forward end or nose 32 of the fish and a second transverse aperture or cross bore 34 which extends through the sides 16 and 18 of the fish. The means also includes first and second channels 36 and 38 which extend from the forward end 32 into the second aperture 34 and are defined by opposed spaced wall portions 40, 42, 44 and 46. A plane through the center of the channels extends through the axis of the bore 30. The channels 36 and 38 permit movement of the fish lure and the loop 48 through aperture 30 and into the aperture 34.

The loop 48 forms part of the means for detachably securing the fish lures to the fish line 28. More specifically, the loop 48 comprises a length of string 50 which is formed into the loop and secured by a knot 52 located in a counterbore 54 in the fish lure. The means for detachably connecting the fish lure to the line 28 also includes a simulated float or bobber 56 which is secured to the fishline 28 at or adjacent the end of the fishline 28. The loop 48 receives the float 56 to connect the fish lure to the fishline.

Figure 2:
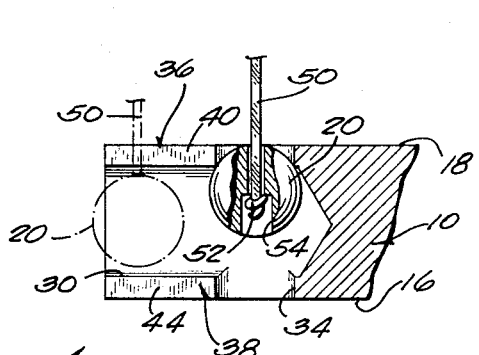
Figure 3:
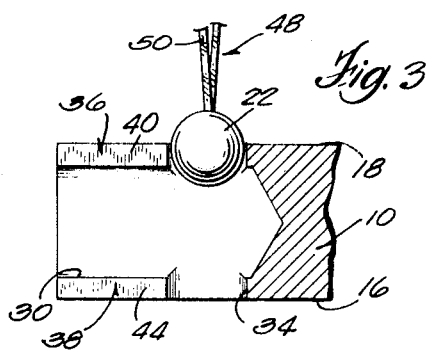

In playing the game, a fish lure 20 is received in the first aperture 30 of fish 10 (FIG. 2) if the aperture 30 has a larger diameter than the lure 20. Upon movement of the lure into aperture 34, the fish lure 20 will couple with the fish 10 if the lure 20 has a larger diameter than the aperture 34. Thus the fish shown in FIG. 2 can be raised by manipulation of the fish pole 26. The fish lure shown in FIG. 3 has a smaller diameter than aperture 34, thus the lure 22 will be released from the fish 12 when the lure 22 is raised by movement of the pole 26. The lure 20 shown in FIG. 2 can have the same color as the fish with which it couples. For instance, the fish 10 and the lure 20 can be colored red, the fish 12 and the lure 22 can be blue, and the fish 16 and the lure 24 can be yellow.

Alternatively, the fish lure and the fish with which it couples can have matching indicia.

Figure 4:
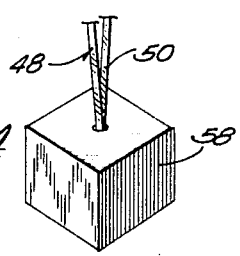
Figure 5:
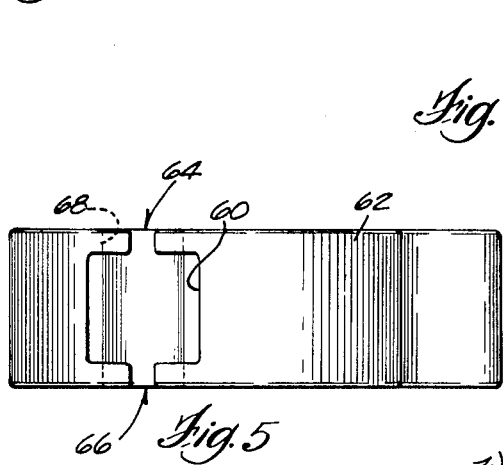

The selectivity of coupling between some lure or lures with any of the fish can be afforded by using lures and apertures of varying diameters or by using lures and apertures having different geometric configurations. For example, FIG. 4 shows a lure in the form of a cube or a hexahedron 58 which is received in a square aperture 60 in the imitation fish 62 shown in FIG. 5. The fish 62 is also provided with channels 64 and 66 to permit movement of the loop 48 into the second aperture 68 in the fish 62.

Figure 6:
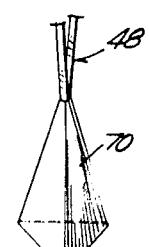

FIG. 6 discloses a further embodiment of a fishing lure 70 in which the lure is in the form of a triangular pyramid or tetrahedron. A fish can be provided with an aperture with an appropriate configuration for receiving and retaining the lure 70.

The game can include one or more fish poles and any number of fish and lures.

Various of the features and advantages of the invention will become apparent from the following disclosure.

What is claimed is:

1. A game comprising a plurality of imitation fish lures, a fish pole including a fishline, means for detachably connecting said fish lures to said fishline, a plurality of imitation fish, each of said fish including a first aperture defining a simulated fishmouth adapted to selectively receive some of said lures and exclude other of said lures, a second through aperture smaller than said first aperture and extending transverse to said first aperture and located at the end of said first aperture and adapted to couple with one of said lures to permit raising of said fish from a surface with said fish pole and line to simulate fish-catching activity.

2. A game in accordance with claim 1, wherein said fish lures have different geometric configurations.

3. A game in accordance with claim 1, wherein said fish lures are of varying sizes.

4. A game in accordance with claim 1, wherein said fish lure and said fish with which said lure couples have matching indicia.

5. A game in accordance with claim 1, wherein the said fish lure and said fish with which said lure couples have matching colors.

6. A game in accordance with claim 1, wherein said means for detachably connecting said lures to said line comprises a simulated fishing float connected to said fishline, and a string connected to said lure to form a loop adapted to receive said float and connect said lure to said float.

7. A game comprising a plurality of imitation fish channels, a fish pole including a fishline connectable to said lures, a plurality of imitation fish having a forward end and generally parallel, flat opposed first and second sides, a first aperture extending inwardly from the forward end of said fish, to define a simulated fishmouth adapted to selectively receive some of said lures and exclude others of said lures a second aperture extending transversely to said first aperture and extending through the sides of said fish and in communication with said first aperture, and wall means defining first and second channels, said first and second channels extending from said forward end of said fish to said second aperture and each of said channels opening in one of said first and second sides and in communication with said first aperture to afford movement of said fishline and one of said lures from said first aperture to said second aperture.

8. A game in accordance with claim 7, wherein said fish lures are in the form of a sphere, and said first and second apertures are in the form of cylindrical bores.

9. A game in accordance with claim 7, wherein one of said fish lures is in the form of a cube, and said first aperture is square.

10. A game in accordance with claim 7, wherein said second aperture simulates a fisheye.

* * * * *

UNITED STATES PATENT OFFICE
CERTIFICATE OF CORRECTION

Patent No. 3,620,532　　　　　　　Dated November 16, 1971

Inventor(s)　Russell H. Graf

It is certified that error appears in the above-identified patent and that said Letters Patent are hereby corrected as shown below:

Column 2, Line 39, insert <u>22</u> after the word "lure"

Column 3, Line 20, delete "channels" and insert <u>lures</u> in its place

Signed and sealed this 23rd day of May 1972.

(SEAL)
Attest:

EDWARD M.FLETCHER,JR.　　　　　ROBERT GOTTSCHALK
Attesting Officer　　　　　　　　Commissioner of Patents